United States Patent [19]

Besson

[11] Patent Number: 4,896,731

[45] Date of Patent: Jan. 30, 1990

[54] REVERSIBLE SEMI-MOUNTED PLOW WITH A LOCKABLE ARTICULATION

[75] Inventor: Alphonse Besson, Montigne Sur Moine, France

[73] Assignee: S.A.R.L. Ets Gregoire-Besson Et Cie, Montigne Sur Moine, France

[21] Appl. No.: 210,783

[22] Filed: Jun. 24, 1988

[30] Foreign Application Priority Data

Jun. 29, 1987 [FR] France .................. 87 09124

[51] Int. Cl.$^4$ .................. A01B 3/16
[52] U.S. Cl. .................. 172/225; 172/204; 172/314; 403/93; 403/102
[58] Field of Search .................. 172/224, 225, 226, 314, 172/502, 776, 310, 315, 481, 501; 280/474, DIG. 14; 403/93, 102

[56] References Cited

U.S. PATENT DOCUMENTS

| | | | |
|---|---|---|---|
| 2,879,079 | 3/1959 | Edwards | 280/474 X |
| 3,965,989 | 6/1976 | Ward | 172/310 |
| 3,983,944 | 10/1976 | Farrant | 172/314 |
| 4,036,306 | 7/1977 | Kinzenbaw | 172/310 X |
| 4,121,852 | 10/1978 | Quanbeck | 172/314 X |
| 4,135,582 | 1/1979 | Farrant | 172/314 X |
| 4,266,618 | 5/1981 | Wheeler et al. | 172/314 |
| 4,271,913 | 6/1981 | Wheeler et al. | 172/314 X |
| 4,301,872 | 11/1981 | Hastings et al. | 172/314 X |

FOREIGN PATENT DOCUMENTS

| | | |
|---|---|---|
| 7202127 | 1/1972 | Fed. Rep. of Germany . |
| 3325603 | 1/1985 | Fed. Rep. of Germany . |
| 1595642 | 7/1970 | France . |
| 2201022 | 4/1974 | France . |

Primary Examiner—Randolph A. Reese
Assistant Examiner—Jeffrey L. Thompson
Attorney, Agent, or Firm—Young & Thompson

[57] ABSTRACT

A multifurrow reversible semi-mounted plough comprising a large number of plough-bodies fixed on a beam. The beam is constituted by at least two elements (12) connected two by two via an articulation (13) about an axis (16), horizontal in the working position of the plough, with structure (20, 21) for locking the articulation or articulations, the articulation (13) being preferably provided in the central portion (7) of the beam substantially in line with the wheel support group (8-10) of this central portion. The invention allows having a ploughing depth of the ploughshares almost equal on all the ploughshares in spite of the large width of the plough.

4 Claims, 2 Drawing Sheets

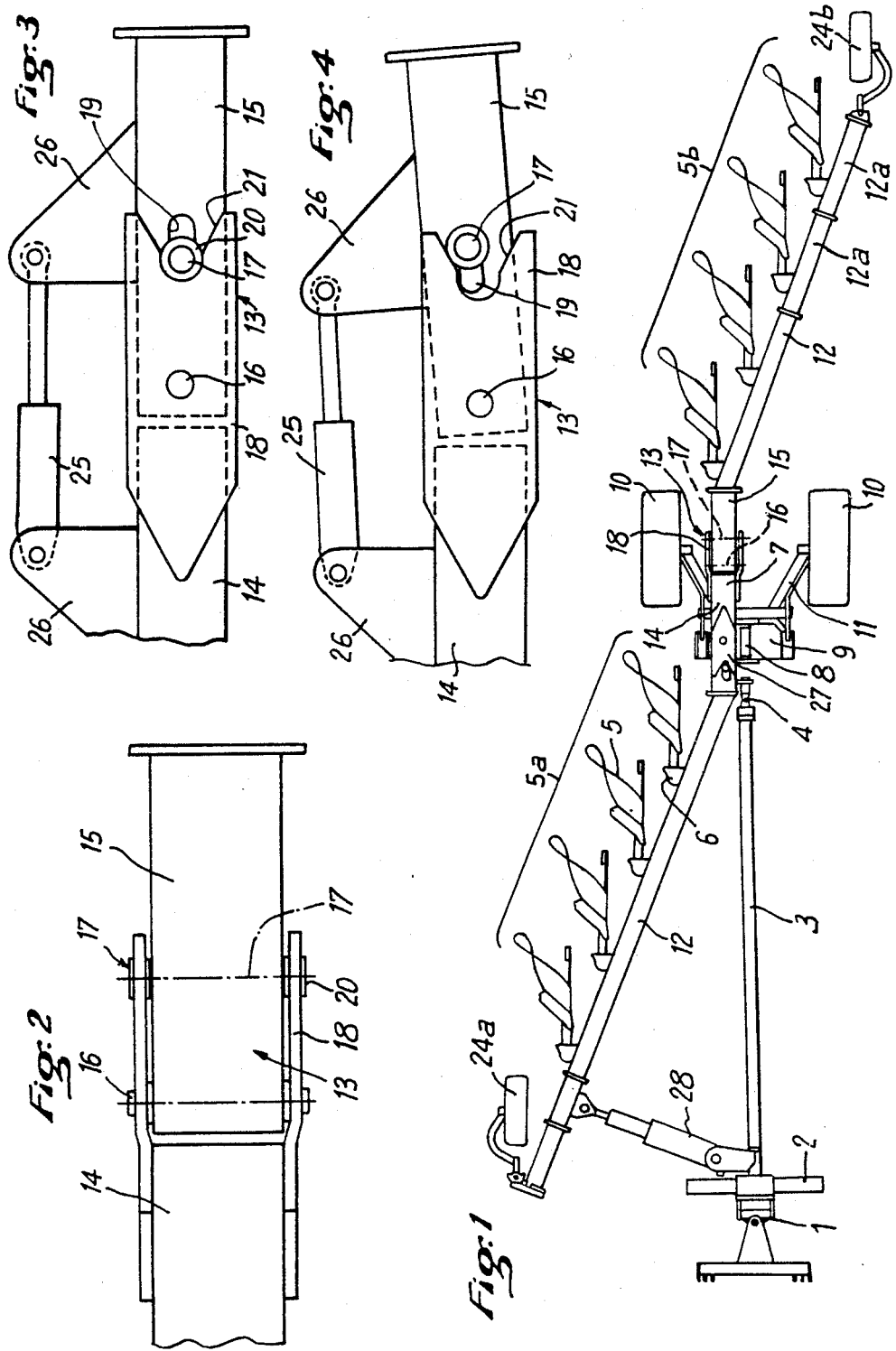

REVERSIBLE SEMI-MOUNTED PLOW WITH A LOCKABLE ARTICULATION

FIELD AND BACKGROUND OF THE INVENTION

The present invention relates to multifurrow reversible semi-mounted ploughs, comprising a large number of ploughshares, notably more than six and possibly reaching a number of ten or more. In these ploughs, the plough-bodies constituted by two symmetrical mould board ploughshares are fixed to an oblique girder or beam, comprising a central portion oriented substantially along the working axis, with, on either side of this portion, oblique portions extending to the front and to the rear. The plough-bodies are fixed on the oblique portions and the central portion of the beam is rotatably mounted about a longitudinal axis on a support group with one or two wheels of any known type via a lifting device allowing lifting of the whole plough in order to turn it over. This type of plough with eight, ten and even twelve pairs of ploughshares, is increasing in commercial development in proportion to the increased powers of the tractors with a view to providing an increased labour efficiency.

However, the length of these ploughs is large since it reaches 9 meters for eight plough-body ploughs and 11 meters for ten body-ploughs. It follows that land unevennesses result in a difference of ploughing depth of the ploughshares. For an inclination of 5° of the beam between the front plough-bodies and the medial point in line with the support group, the rear plough-body will present, for a plough with ten bodies, a difference of ploughing depth with the front body of $0.087 \times 550$ cm = 48 cm, this difference of ploughing depth being, with an eight body plough and for the same inclination, of $0.087 \times 450$ cm = 39 cm. These values are 9 cm and 16 cm respectively for an angle of only 2°. If in fact the wheel support group passes over a high point or a low point of the ground having a difference of level of x centimeters with the line joining the bearing points of the rear and front bodies and if the ploughing depth of the front body is fixed, for example by the tractor, the ploughing depth of the rear plough-body will be modified by 2x centimeters.

Moreoever, the length of these ploughs increases the width of the landsides at the beginning and at the end of the fields since the ends of the furrows are staggered over the length of the plough and since the coupling necessitates a large evolution surface in order to re-align the plough.

OBJECTS AND SUMMARY OF THE INVENTION

The object of the present invention is to remedy these disadvantages and the multifurrow reversible semi-mounted plough according to the invention is characterized in that the beam is constituted by at least two elements interconnected via an articulation about a horizontal axis in a working position of the plough, with means for locking said articulation or articulations.

According to a preferential embodiment, the articulation is provided in the central portion of the beam, substantially in line with the wheel support group of this central portion.

According to another feature, gauging wheels are provided at the free end or ends of the beam and in the vicinity of each articulation. According to a preferential embodiment, a gauging wheel is provided at each of the front and rear ends of the beam, these wheels cooperating for the setting of the ploughing depth with the gauging wheels constituted by the wheel support group of the central portion.

According to another feature, the means for locking the articulation are constituted by a mobile key, carried by one of the articulated beam elements, engaging into a notch formed in the other element of the beam. According to a preferential embodiment, the key is constituted by a cylindrical element slidably mounted parallel to the articulation axis in a horizontal slide, while protruding on both sides of the beam element, and the notch is constituted by two V-shaped cut-outs in register, formed in two flanges integral with the other beam element and disposed on either side of the first beam element.

According to another feature, the opening of the angle between the two elements having a same articulation is settable and controllable in the unlocked state of the articulation, notably by a double action jack. This characteristic which allows driving into the ground, at various moments, the front and rear ploughshare groups, allows reducing the length of a landslide, whereby the ploughing with the front body group can be effected, over the half length of the plough, with the rear body group lifted and passing above a seed plot or the like on the neighbouring parcel of land.

According to another feature, at least one articulation, lockable about a vertical axis, is provided over the length of the beam. According to a preferential embodiment, the relative orientation of the two elements having the vertical articulation is controllable by a double action jack. This characteristic is more particularly interesting in combination with the hereabove characteristics for reducing the space requirement when the plough is making a turn and for maintaining in a controlled manner, for example, the rear body group in an aligned ploughing position, while the tractor starts turning in the landslide while the front body group is lifted.

BRIEF DESCRIPTION OF DRAWINGS

Other features of the invention will become more apparent from the reading of the hereafter description of an embodiment, with reference to the accompanying drawings wherein:

FIG. 1 is a schematic plan view of an eight plough-body plough according to the invention;

FIG. 2 is a detailed plan view of the articulation;

FIG. 3 is a detailed elevation view of an articulation with a control of the opening of the angle;

FIG. 4 is a view corresponding to FIG. 3 with the articulation unlocked;

DETAILED DESCRIPTION OF THE INVENTION

Figure 5:
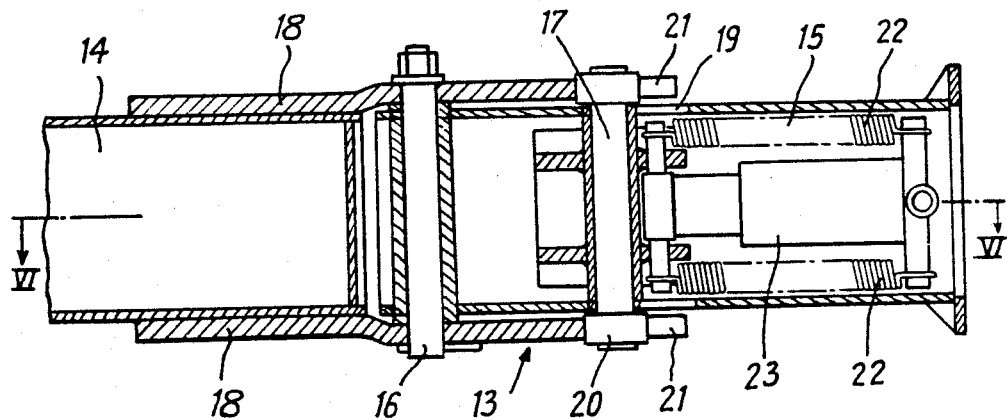
FIG. 5 is a sectional detailed view along line V—V of FIG. 6.

In the drawings, reference numeral 1 designates the coupling point on the tractor and 2 the turning over control device of the plough. Reference numeral 3 designates the traction beam which is rigidly connected to the plough by a swivel joint 4.

Reference numeral 5 designates the plough-bodies spaced apart along two plough-shares with symmetrical mould boards, each of said bodies being fixed at 6 by a strut on a longitudinal girder or "beam". The plough shown includes eight plough-bodies distributed into a front group 5a and a rear group 5b, each group comprising four bodies.

The beam includes a central portion 7 which is rotatably mounted about a longitudinal axle 8, which is in turn carried by a cross-beam or chassis 9 carried by two wheels 10 mounted at the ends of oscillating arms 11 whose inclination can be set by jacks in order to lift or lower the chassis 9 and therefore the whole of the plough so as to set the ploughing depth or to allow its turning over. At its front and rear ends, the central portion carries two oblique beam elements 12, one in the front and the other in the rear. In known manner, these beam elements can be constituted by beam stubs 12a connected by flanges in order to allow modifying the number of bodies of the plough.

The plough such as described hereabove is standard.

According to the invention, a horizontal axis articulation designated as a whole by reference numeral 13 is provided on the central portion 7 of the beam which includes a front element 14 and a rear element 15 connected by an axle 16. In order to neutralize this articulation and to rigidly connect the elements 14 and 15 of the central portion, a shaft stub 17 is slidably mounted into two openings 19 formed in the opposed flanks of element 15. The means controlling the sliding will be described hereafter in more detail. At the ends of the shaft stub 17 are mounted two rollers 20 which cooperate with a V-shaped cam 21 having an apex in the shape of an arc of a circle formed in the ends of two flanges 18 welded on the side flanks of the front element 14 and extending beyond axle 16, with the bearing surfaces on element 14 being provided in said flanges, up to the opening 19.

Figure 6:
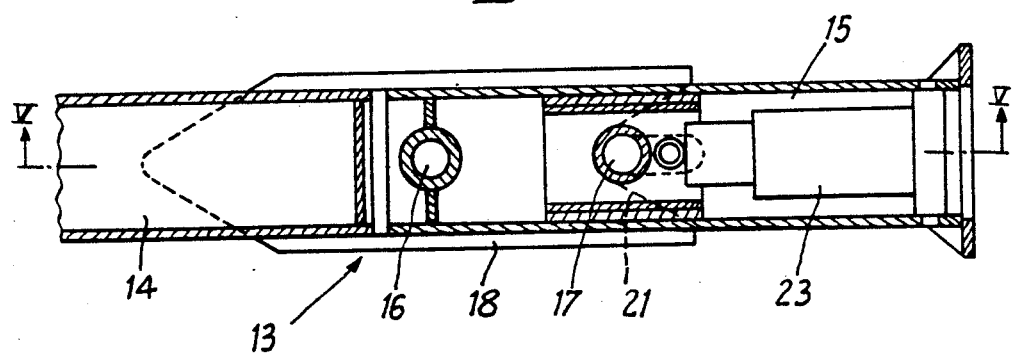
FIG. 6 is a sectional detailed view along line VI—VI of FIG. 5.

As shown by way of example in FIGS. 5 and 6, the unlocking control of the articulation about the axle 16 can be provided by subjecting shaft stub 17 to the bias of two springs 22 which tend to extract the rollers 20 from the cams 21 in order to let the articulation 13 move freely, and by pushing into engagement the rollers 20 in the apex of the V-shaped notches forming the cams 21 with a pushing hydraulic jack 23. In practice, the articulation is locked only during the manoeuvre periods and notably during the turning over, for which reason there has been chosen an automatic unlocking by the springs 22 and a locking which requires a larger force when the elements have to be realigned prior to the locking, by the positive thrust of a jack. A reverse or positive double control disposition by a jack could also be adopted.

In view of the inclination freedom thus imparted to elements 12 of the beam and for maintaining the ploughing depth of the ploughshares of each group 5a, 5b, front 24a and rear 24b ploughing depth wheels are mounted at the ends of elements 5a and 5b.

According to another feature constituting a development of the invention, a double action jack 25 is mounted between two bracket elements 26 rigidly connected to elements 14 and 15. In this case, the openings 19 are preferably prolongated in order that the rollers 20 can escape from the branches of the V-shaped cut-out 21, thereby allowing increasing the relative inclination angle. This allows for lifting up the ploughshares of the plough-body group 5b while putting the ploughshares of group 5a in a working position by lowering the central portion 7 and bringing down the coupling point 2 on the tractor in order to bring wheel 24a to bear on the ground.

According to another characteristic constituting another development of the invention, a vertical axis articulation, designated by general reference numeral 27, is provided on the central portion 7 so that the inclination between the two front and rear elements 12 can be modified in order to bring closer or to spread apart the ploughbodies from beam 3. This movement can be controlled with the assistance of a double action jack 28. This disposition allows avoiding an obstacle without deflecting the ploughing line, or in the case where the tractor turns, maintaining the ploughing line of the bodies of the rear group or to set that of the whole group by moving aside or bringing closer the front beam element of beam 3, thereby exerting a couple for maintaining in line the group of bodies in question while the tractor is not in line. For facilitating the manoeuvre, the jack 28 can be of the oleo-pneumatic type for leaving a guiding component in existence by the ploughing depth wheel and the ploughshares.

What is claimed:

1. A multifurrow reversible semi-mounted plough comprising a large number of plough-bodies fixed on a beam, the beam being constituted by at least two elements interconnected via an articulation about an axis which is horizontal in a working position of the plough, and means for selectively locking and unlocking said articulation, said means for selectively locking and unlocking said articulation comprising a mobile pin member carried by one of the articulated beam elements, engaging in a generally V-shaped notch formed in the other beam element, and means for remotely selectively moving said pin member into and out of said notch.

2. A plough as claimed in claim 1, in which the pin member is a cylindrical element slidably mounted on said one articulated beam element parallel to said axis, in a horizontal slide, said key protruding on both sides of the beam element, the notch being comprised by two V-shaped cut-outs in register with each other and formed in two flanges integral with the other beam element and disposed on either side of said one beam element.

3. A multifurrow reversible semi-mounted plough comprising a large number of plough-bodies fixed on a beam, the beam being constituted by at least two elements interconnected via an articulation about an axis which is horizontal in a working position of the plough, means for selectively remotely locking and unlocking said articulation, said means for selectively locking and unlocking said articulation comprising a mobile pin member carried by one of the articulated beam elements, engaging in a generally V-shaped notch formed in the other beam element, means for remotely selectively moving said pin member into and out of said notch and a double-acting jack connected between flanges extending from each of said two elements for selectively changing the angle between said two elements in the unlocked state of the articulation.

4. A multifurrow reversible semi-mounted plough comprising a large number of plough-bodies fixed on a beam, the beam being constituted by at least two elements interconnected via an articulation about an axis which is horizontal in a working position of the plough, means for remotely selectively locking and unlocking said articulation, another lockable articulation between said elements about a vertical axis, and a double-acting jack connected between one of said elements and a stationary point on the plough for selectively changing the angle between said elements about said vertical axis.

* * * * *